United States Patent
Chen et al.

(10) Patent No.: US 7,598,357 B1
(45) Date of Patent: Oct. 6, 2009

(54) BIS-REACTIVE DYE WITH N,N-DIALKYLAMINO BRIDGE GROUP

(75) Inventors: Wen-Jang Chen, Jhongli (TW); Hong-Chang Huang, Taipei (TW); Ya-Cing Yu, Taichung (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 12/289,417

(22) Filed: Oct. 28, 2008

(30) Foreign Application Priority Data

Aug. 15, 2008 (CN) .......................... 2008 1 0210953

(51) Int. Cl.
*C09B 62/09* (2006.01)
(52) U.S. Cl. ....................................... 534/634; 534/632
(58) Field of Classification Search .................... None
See application file for complete search history.

(56) References Cited

U.S. PATENT DOCUMENTS

| | | | |
|---|---|---|---|
| 7,488,354 B2* | 2/2009 | Daubress et al. ............... | 8/405 |
| 2006/0080791 A1* | 4/2006 | Daubresse et al. .............. | 8/405 |
| 2009/0126755 A1* | 5/2009 | Guerin et al. ............... | 132/208 |

OTHER PUBLICATIONS

Yousef et al., Coloration Technology, 118(1), 20-25, 2002.*
Youssef et al., Coloration Technology, 118(6), 325-329, 2002.*

* cited by examiner

*Primary Examiner*—Fiona T Powers
(74) *Attorney, Agent, or Firm*—Bacon & Thomas, PLLC

(57) ABSTRACT

The present invention relates to a novel bis-reactive dye with N,N-dialkylamino bridge group, represented by the following formula (I):

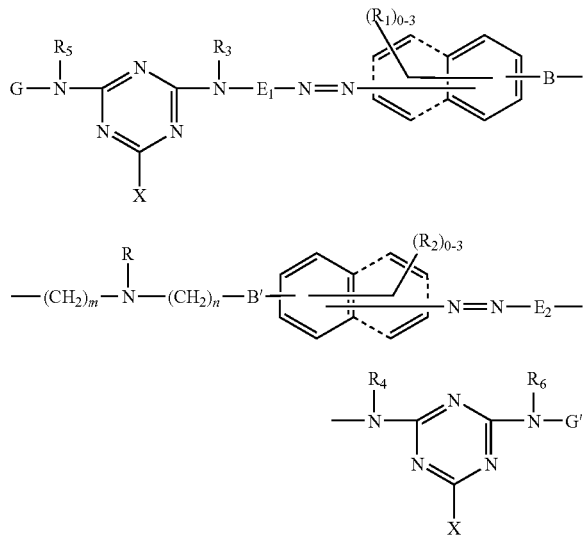

wherein $E_1$, $E_2$, $R$, $R_1$, $R_2$, $R_3$, $R_4$, $R_5$, $R_6$, $G$, $G'$, $B$, $B'$, $X$, $m$, and $n$ are defined the same as the specification. The bis-reactive dye of the present invention is suitable for exhaust dyeing, cold pad batch, continuous dyeing, printing and digital spray printing materials that contain hydroxyl group or polyamine fibers.

18 Claims, No Drawings

BIS-REACTIVE DYE WITH N,N-DIALKYLAMINO BRIDGE GROUP

BACKGROUND OF THE INVENTION

1. Field of the Invention

The present invention relates to a novel bis-reactive dye with an N,N-dialkylamino bridge group and, more particularly, to a novel bis-reactive dye that is suitable for exhaust dyeing, cold pad batch dyeing, continuous dyeing, printing and digital spray printing materials that contain hydroxyl group or polyamine fibers.

2. Description of Related Art

An azo dyestuff, where the chromophore thereof is composed of diazo components and coupling components, can be widely employed and used as a reactive dye for heavy color dyeing, such as red, navy blue, black and so on, owing to its board color gamut and high extinction coefficient. Among azo dyestuffs, a navy blue reactive dye with sulphato-ethylsulphone (SES) groups produced in 1957 by Hoechst in Germany, C.I. Reactive Black 5, is the most well-known. C.I. Reactive Black 5 can be used to dye fabrics intensely heavy shade and its structure is represented by the following formula (A).

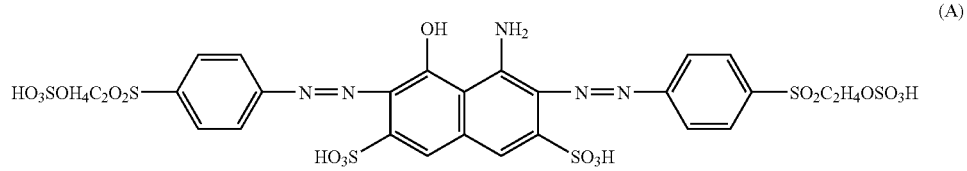

(A)

The reactive dye has bee applied in the dyestuff industry for many years. Currently, the development of reactive dye moves towards higher fixation and better build up to meet the economic demands. Over the years, many researches focus on the development of dyes that show better build up to meet the economic demands in comparison to C.I. Reactive Black 5. For example, in 1980, Hoyer et al. in Hoechst disclosed a tetraazo structure with a sulfonyl bridge group in U.S. Pat. No. 4,244,258. The tetraazo structure is represented by the following formula (B).

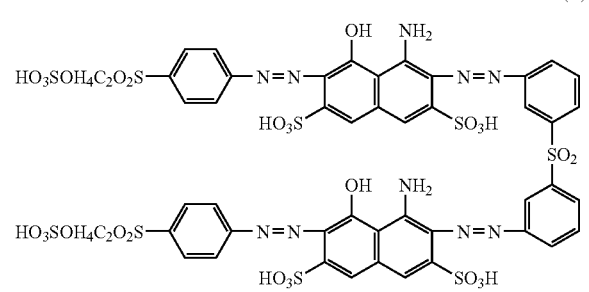

(B)

In 1997, Tzikas et al. in CIBA Geigy disclosed a tetraazo structure with an aminocarbonyl or aminosulfonyl bridge group in U.S. Pat. No. 5,629,410. The tetraazo structure is represented by the following formula (C).

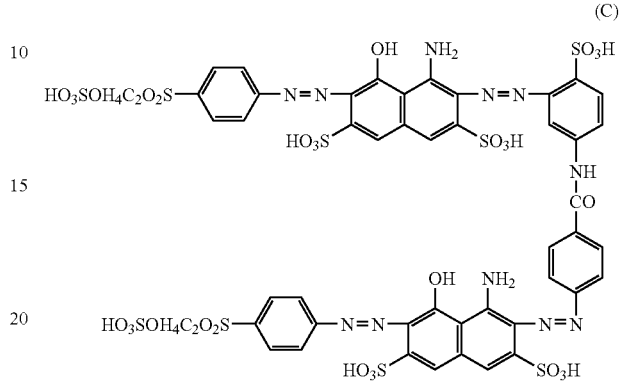

(C)

However, the build up, hue-shift, levelness and wash fastness of the aforementioned novel dyes cannot meet the market requirements. Thereby, it is desirable to improve the aforementioned properties.

SUMMARY OF THE INVENTION

By various experiments, the present inventors discovered that a novel compound with an N,N-dialkylamino bridge group, as shown in the following formula (D), and the method for manufacturing the same can be applied in the reactive dye field to obtain a series of yellow, orange, red, navy blue, black reactive dyes, which can show high color yield, high fixation, improved fastness and stable bonding between the fibers and the dyes.

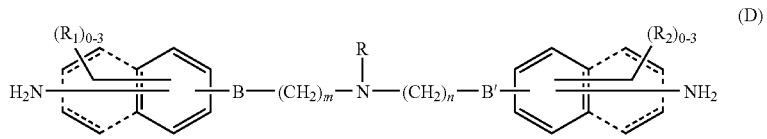

Accordingly, the present invention provides a novel bis-reactive dye with an N,N-dialkylamino bridge group, which exhibits the properties of improved fixation yield, excellent build up, high wash fastness and excellent wet fastness while dyeing cellulose fibers.

A bis-reactive dye with N,N-dialkylamino bridge group according to the present invention is represented by the following formula (I),

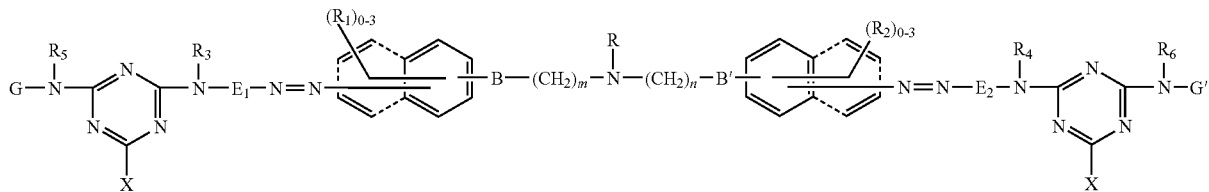

wherein $E_1$, and $E_2$ each independently are selected from the group consisting of substituted or unsubstituted benzene component, substituted or unsubstituted naphthalene component, and substituted or unsubstituted monoazo component;

R is hydrogen, $C_{1-4}$ alkyl, $C_{1-4}$ alkylcarbonyl, phenyl, nitroso, or $C_{1-4}$ alkyl substituted with halogen, hydroxyl, carboxyl or sulfo;

$(R_1)_{0-3}$, and $(R_2)_{0-3}$ each independently are 0 to 3 identical or different groups, and each of $R_1$, and $R_2$ is independently selected from the group consisting of hydrogen, halogen, hydroxyl, carboxyl, sulfo, nitro, cyano, $C_{1-4}$ alkyl, $C_{1-4}$ alkoxy, ureido, and amido;

$R_3$, and $R_4$ each independently are hydrogen or $C_{1-4}$ alkyl;

$R_5$, and $R_6$ each independently are hydrogen, $C_{1-4}$ alkyl, or phenyl;

G, and G' each independently are selected from the group consisting of hydrogen,

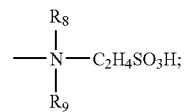

Q, and substituted or unsubstituted $C_{1-4}$ alkyl;

$(R_7)_{0-3}$ is 0 to 3 identical or different groups, and each of $R_7$ is independently selected from the group consisting of hydrogen, halogen, hydroxyl, carboxyl, sulfo, nitro, cyano, $C_{1-4}$ alkyl, $C_{1-4}$ alkoxy, ureido, and amido;

B, and B' each independently are selected from the group consisting of a direct bond, —$SO_2$—, and —CONH—$(CH_2)_k$—$SO_2$—;

k is an integer of 1, 2, 3, 4, 5, or 6;

Q is selected from the group consisting of —$SO_2$—U, —CONH—$(CH_2)_d$—$SO_2$—U, —O—$(CH_2)_r$— CONH—$(CH_2)_d$—$SO_2$—U, β-thiosulfatoethylsulfonyl, —R'—$SO_2$—U, and —R'—U';

R' is $C_{1-4}$ alkyl or phenyl;

d, and r each independently are an integer of 2, 3, or 4;

U is —$CH_2CH_2W$, or —$CH=CH_2$;

W is —Cl, —$OSO_3H$, —$OPO_3H$, quaternary ammonium, pyridine, carboxypyridinium, methylpyridinium, carbonamidopyridinium, or

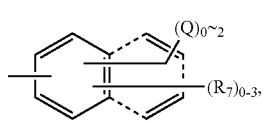

$R_8$, and $R_9$ each independently are hydrogen, or $C_{1-4}$ alkyl;

U' is α,β-halopropionyl, α-halopropionyl, β-halopropionyl, or α-haloacrylol;

X is halogen; and m, and n each independently are an integer of 2, 3, or 4.

In the bis-reactive dye of the formula (I) according to the present invention, $E_1$ and $E_2$ may each independently be a benzene component. Preferably, $E_1$ and $E_2$ each independently are represented by the following formula (* represents a position for coupling),

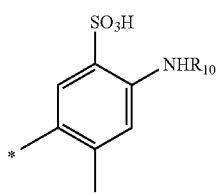
(I-1)

wherein $R_{10}$ is hydrogen, $C_{1-4}$ alkyl, $C_{2-4}$ alkylcarboxyl, or $C_{1-4}$ alkyl substituted with hydroxyl, cayno, carboxyl, sulfo, methoxycarbonyl, ethoxycarbonyl, or acetoxy.

In the bis-reactive dye of the formula (I) according to the present invention, $E_1$ and $E_2$ may each independently be a naphthalene component. Preferably, $E_1$ and $E_2$ each independently are represented by the following formula (* represents a position for coupling),

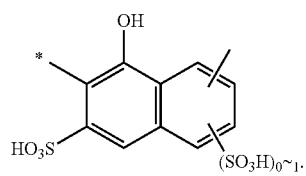
(I-2)

In the bis-reactive dye of the formula (I) according to the present invention, $E_1$ and $E_2$ may each independently be a monoazo component. Preferably, $E_1$ and $E_2$ each independently are represented by the following formula (* represents a position for coupling),

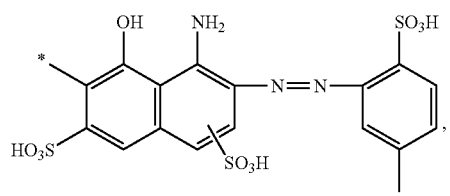
(I-3)

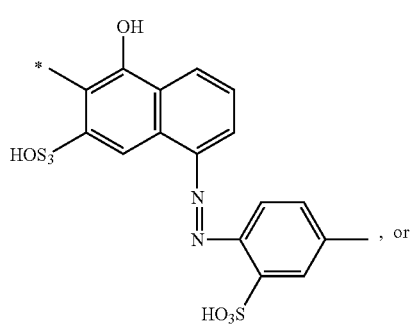
(I-4)

, or

-continued

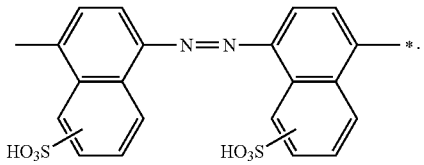
(I-5)

For describing conveniently, the compound is expressed as free acid in the specification. When produced or used, the bis-reactive dye of the present invention are often presented as water-soluble salts. The salts suitable for the present invention may be the alkaline metal salts, alkaline earth metal salts, ammonium salts or organic amine salts; preferably, the salts are sodium salts, potassium salts, lithium salts, ammonium salts or triethanolamine salts.

The bis-reactive dye of the present invention can be prepared by a conventional method. The synthetic routine for preparing the bis-reactive is not strictly limited. For example, a chromophore may be first prepared and then a desired dye is synthesized, or a chromophore may be synthesized in the process for preparing a dye.

The bis-reactive dye of the present invention can be applied to dye and print on many kinds of fiber materials, particularly cellulose fiber materials and cellulose-included fiber materials. The examples of the fiber materials are not limited. It can be natural or regenerated cellulose fibers, such as cotton, hemp, linen, jute, ramie, mucilage rayon, as well as cellulose-included fiber materials. The bis-reactive dye of the present invention can also be applied to dye and print fiber blended fabrics containing hydroxyl groups.

The bis-reactive dye of the present invention can be applied to the fiber material and fixed on the fiber in various ways, in particularly in the form of aqueous dye solutions and printing pastes. They can be applied to dye and print on cellulose fibers by exhaustion dyeing, continuous dyeing, cold-pad-batch dyeing, printing or digital printing.

The dyeing or printing of the present invention can be proceeded by the conventional and usually known method. For example, exhaustion dyeing is applied by using separately or mixing the well-known inorganic salts (e.g. sodium sulfate and sodium chloride) and acid-binding agents (e.g. sodium carbonate, sodium hydroxide). The amount of inorganic salts and alkali does not matter. The inorganic salts and alkali can be added either once or several times into the dyeing bath through traditional methods. In addition, dyeing assistant agents (such as leveling agent, suspending agent and so on) can be added according to conventional method. The range of dyeing temperature is from 40° C. to 90° C. Preferably, the temperature for dyeing is from 50° C. to 70° C.

In the cold-pad-batch dyeing method, the material is padded by using the well-known inorganic salts (e.g. sodium sulfate and sodium chloride) and acid-binding agents (e.g. sodium carbonate, sodium hydroxide). The padded fabric is rolled and stored at room temperature to allow dye fixation to take place.

In the continuous dyeing method, two different methods exist. In the one-bath pad dyeing method, the material is padded according to the conventional method in the mixture of the well-known acid-binding agents (e.g. sodium carbonate or sodium bicarbonate) and the pad liquid. The resultant material is then dried and color fixed by baking or steaming.

In the two-bath pad dyeing method, the material is padded with a dye liquid and then dealt by a known inorganic neutral salt (e.g., sodium sulfate or sodium silicate). The dealt material is preferably dried and color fixed by baking or steaming as usual.

In the textile printing method, such as single printing method, the material is printed by printing slurry containing the known acid-binding agent (e.g., sodium bicarbonate) and is dried and color fixed by baking or steaming.

In the two-phase printing method, the material is dipped in a solution containing inorganic neutral salt (e.g., sodium chloride) and the known acid-binding agent (e.g., sodium hydroxide or sodium carbonate) in a high temperature of 90° C. or above to fix the color.

The dyeing or printing methods employed in the process of the present invention are not limited to the above methods.

Other objects, advantages, and novel features of the invention will become more apparent from the following detailed description when taken in conjunction with the accompanying drawings.

BRIEF DESCRIPTION OF THE DRAWINGS

None.

DETAILED DESCRIPTION OF THE PREFERRED EMBODIMENT

For convenience in the statement, the following examples are exemplified for a more concrete description. Many examples have been used to illustrate the present invention. The examples sited below should not be taken as a limit to the scope of the invention. The compounds are represented in the form of free acid. However, in practice, they often exist as metallic salts, and most likely alkaline metallic salts, particularly sodium salts. Unless otherwise stated, the parts and percentage used in the following examples are based on weight, and the temperature is in Celsius degree (° C.).

Example 1

14.05 parts of p-(vinylsulphone)-phenylamine was dissolved in 50 parts of water, and the temperature of the reaction solution was controlled at 0~5° C. After adding 45% NaOH into the reaction solution, the reaction solution was stirred for a while, followed by the addition of 2 parts of 40% methylamine, and then the reaction was performed for 4 hours at room temperature. The product of the formula (1) is obtained by crystallization, filtration and dryness.

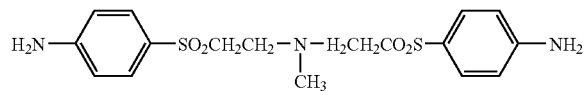

(1)

Example 2

16 parts of 2-methoxyl-5-(vinylsulphone)-phenylamine was dissolved in 60 parts of water, and the temperature of the reaction solution was controlled at 0~5° C. After adding 45% NaOH into the reaction solution, the reaction solution was stirred for a while, followed by the addition of 2 parts of 40% methylamine, and then the reaction was performed for 4 hours at room temperature to obtain the product of the formula (2).

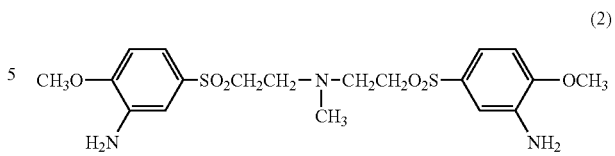

(2)

Example 3

28.1 parts of p-(vinylsulphone)-phenylamine was dissolved in 100 parts of water, and the temperature of the reaction solution was controlled at 0~5° C. After adding 45% NaOH into the reaction solution, the reaction solution was stirred for a while, followed by the addition of 3 parts of 40% ethanolamine, and then the reaction was performed at room temperature. The product of the formula (3) is obtained by crystallization, filtration and dryness.

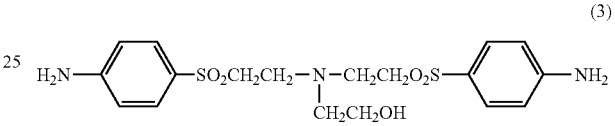

(3)

Example 4

14.05 parts of p-(vinylsulphone)-phenylamine was dissolved in 50 parts of water, and the temperature of the reaction solution was controlled at 0~5° C. After adding 45% NaOH into the reaction solution, the reaction solution was stirred for a while, followed by the addition of 4 parts of 40% methylamine, and then the reaction was performed for 4 hours at room temperature. Then, 16 parts of 2-methoxyl-5-(vinylsulphone)-phenylamine was added into the reaction solution, and the temperature of the reaction solution was controlled at room temperature. After stirring for a while, the product of the formula (4) is obtained.

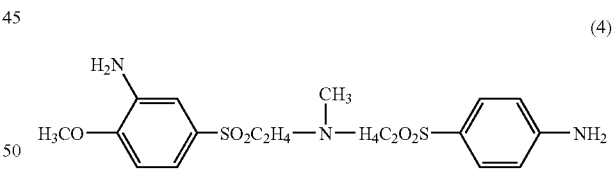

(4)

Example 5

(a) 9.4 parts of 1,3-phenylenediamine-4-sulfonic acid was dissolved, and added dropwise into 9.5 parts of cooled dispersion solution of cyanuric chloride. The temperature of the reaction solution was controlled at 0~5° C. After reaction for 1 hour, the pH of the solution was adjusted to natural, followed by addition of 3.59 parts of sodium nitrite and 19 parts of 32% HCl. Diazotization was performed for 2 hours under 0~5° C. to obtain a solution.

(b) 16 parts of 1-Naphthol-8-amino-3,6-disulfonic acid was dissolved in alkali solution, and added dropwise into the solution obtained from (a). After the reaction was performed for a while, 14 parts of 4-(β-sulfatoethylsulfone)- aniline was added therein, and the pH of the reaction solution was adjusted to 3~5 with 15% sodium carbonate. The reaction was performed for 2 hours to obtain a solution.

(c) 30 parts of water was added into a solution with 2 parts of compound of formula (1) and 3 parts of 32% HCl, followed by completely stirring and dispersion of the reaction solution. Then, 0.76 parts of sodium nitrite was added therein, and diazotization was performed under 0~5° C. and completed after 1 hour.

(d) The solution obtained form (b) was added into the solution obtained from (c), and the pH of the reaction solution was adjusted with 15% sodium carbonate. After the coupling reaction was performed for 4 hours, a blue product of the formula (5) was obtained by salt out.

and 19 parts of 32% HCl. Diazotization was performed for 2 hours under 0~5° C. to obtain a solution.

(b) 16 parts of H acid was dissolved in alkali solution, and added dropwise into the solution obtained from (a). After the reaction was performed for a while, 14 parts of 4-(β-sulfatoethylsulfone)aniline was added therein, and the pH of the reaction solution was adjusted to 3~5 with 15% sodium carbonate. The reaction was performed for 2 hours to obtain a solution.

(c) 30 parts of water was added into a solution with 14 parts of the compound of formula (2) and 8 parts of 32% HCl, followed by completely stirring and dispersion of the reac-

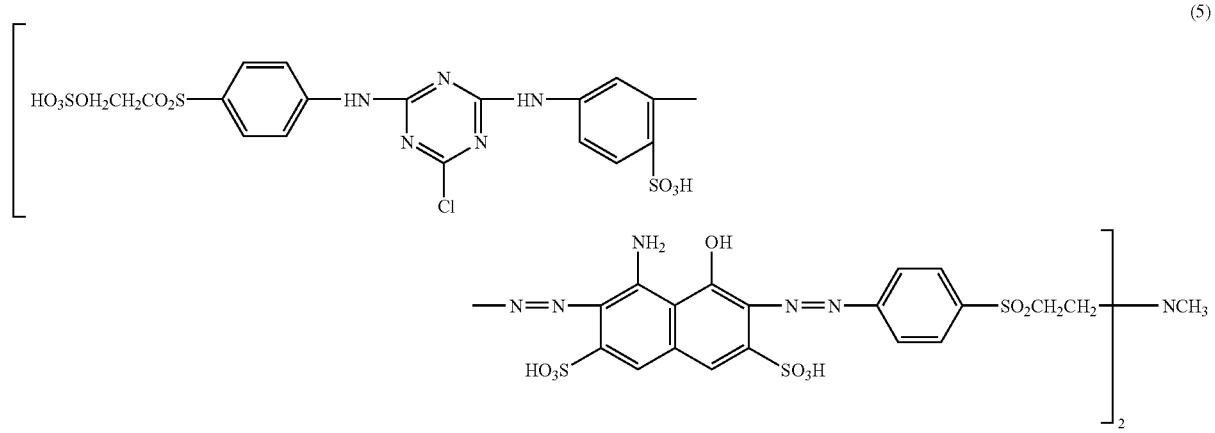

Example 6

(a) 9.4 parts of 1,3-phenylenediamine-4-sulfonic acid was dissolved, and added dropwise into 9.5 parts of cooled dispersion solution of cyanuric chloride. The temperature of the reaction solution was controlled at 0~5° C. After reaction for 1 hour, the pH of the solution was adjusted to natural, followed by addition of 3.59 parts of sodium nitrite tion solution. Then, 0.7 parts of sodium nitrite was added therein, and diazotization was performed under 0~5° C. and completed after 1 hour.

(d) The solution obtained form (b) was added into the solution obtained from (c), and the pH of the reaction solution was adjusted with 15% sodium carbonate. After the coupling reaction was performed for 4 hours, a blue product of the formula (6) was obtained by salt out.

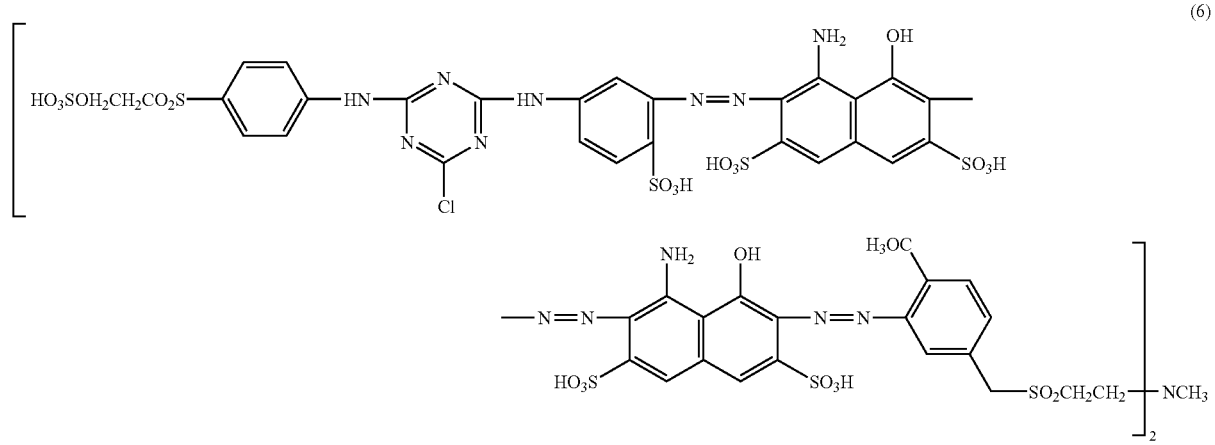

Example 7

(a) 1.73 parts of 1,3-phenylenediamine-4-sulfonic acid was dissolved in 15% sodium carbonate, and added dropwise into 1.86 parts of cooled dispersion solution of cyanuric chloride. The pH of the reaction solution was adjusted to 3.5~4 with 15% sodium carbonate, and the temperature of the reaction solution was controlled at 0~5° C. for 2 hours to obtain a solution.

(b) 3.19 parts of H acid was dissolved in alkali solution, and added dropwise into the solution obtained from (a). The pH of the reaction solution was adjusted to 3~4 with sodium hydrogen carbonate, and the temperature of the reaction solution was controlled at 15~20° C. After reaction for 4 hours to obtain a solution.

(c) 20 parts of water was added into a solution with 2.14 parts of compound of formula (3) and 2.5 parts of 32% HCl, followed by completely stirring and dispersion of the reaction solution. Then, 0.76 parts of sodium nitrite was added therein rapidly, and diazotization was performed under 0~5° C. and completed after 1.5 hours. The resulted solution was added into the solution obtained from (b), and then the pH of the resulted solution was adjusted to 6~7 with sodium hydrogen carbonate. After the reaction was performed for 3 hours, a red product of the formula (7) was obtained by salt out.

0~5° C. and completed after 1.5 hours. The resulted solution was added into the filtrate obtained from (a), and then the pH of the resulted solution was adjusted to 5~7 slowly with sodium hydrogen carbonate. The reaction was performed for 3 hours.

(c) 1.41 parts of m-(β-sulfatoethylsulfone)-aniline was dissolved in 15% sodium carbonate, and then the resulted solution was added into the solution obtained from (b). The pH of the reaction solution was adjusted to 5~7 with sodium hydrogen carbonate, and a red product of the formula (8) was obtained after reacting for 4 hours.

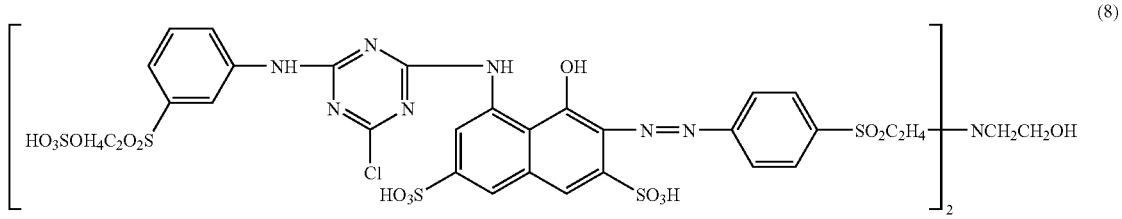

(8)

Example 9

(a) 2.6 parts of 5-amino-2-sulphonic-N-ethhylacetatic-aniline was dissolved in 15% sodium carbonate, and added dropwise into 1.86 parts of cooled dispersion solution of cyanuric chloride. The temperature of the reaction was controlled at 0~5° C. After reaction for 2 hours, a solution was obtained.

(b) 2.81 parts of 4-(β-sulfatoethylsulfone)-aniline was dissolved in alkali solution, and added into the solution obtained from (a). The pH of the reaction solution was adjusted to 3~5 with sodium hydrogen carbonate, and the temperature of the reaction solution was controlled at 30~35° C. After overnight reaction, a solution was obtained.

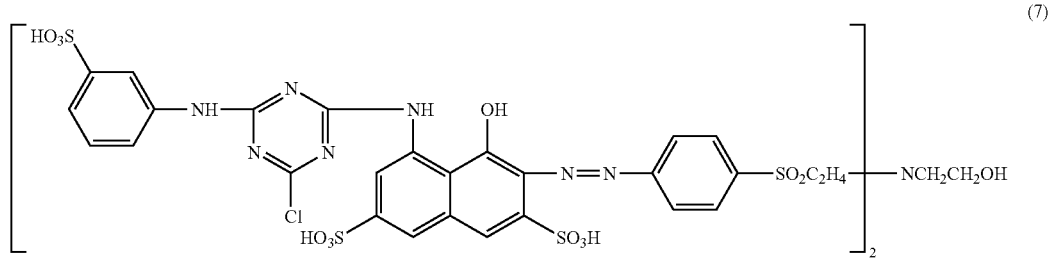

(7)

Example 8

(a) 3.19 parts of 1-Naphthol-8-amino-3,6-disulfonic acid was dissolved in alkali solution, and added dropwise into 1.86 parts of cooled dispersion solution of cyanuric chloride. The pH of the reaction solution was adjusted with sodium hydrogen carbonate, and the temperature of the reaction solution was controlled at 8~10° C. After reaction for 2 hours, a resulted solution was filtered to obtain a filtrate.

(b) 20 parts of water was added into a solution with 2.14 parts of compound of formula (3) and 2.5 parts of 32% HCl, followed by completely stirring and dispersion of the reaction solution. Then, 0.76 parts of sodium nitrite was added therein rapidly, and diazotization was performed under (c) 20 parts of water was added into a solution with 2.14 parts of compound of formula (3) and 2.5 parts of 32% HCl, followed by completely stirring and dispersion of the reaction solution. Then, 0.76 parts of sodium nitrite was added therein rapidly, and diazotization was performed under 0~5° C. and completed after 1.5 hours. The resulted solution was added into the solution obtained from (b), and then the pH of the resulted solution was adjusted to 5~7 with sodium hydrogen carbonate. After the reaction was performed for 4 hours, a yellow product of the formula (9) was obtained.

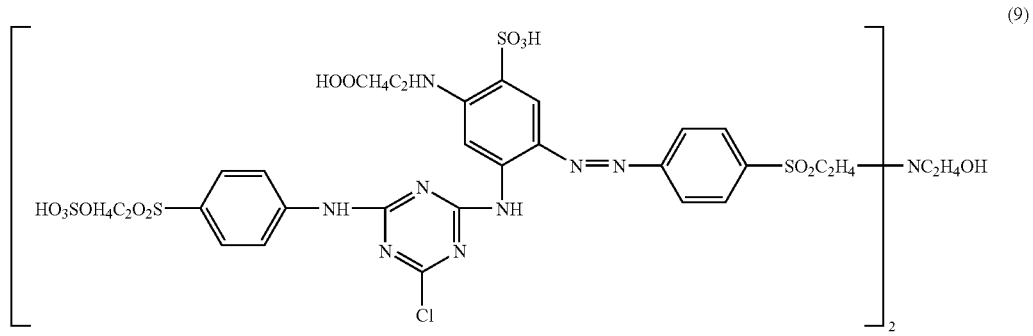

(9)

Example 10

(a) 2.39 parts of 2-amino-5-naphthol-7-sulfonic acid was dissolved in alkali solution, and added dropwise into 1.9 parts of cooled dispersion solution of cyanuric chloride. The pH of the reaction solution was adjusted to 1~3 with 15% sodium carbonate, and the temperature of the reaction solution was controlled at 5~10° C. After reaction for 1.5 hours, the reaction solution was separated to obtain a filtrate.

(b) 2.8 parts of 4-(β-sulfatoethylsulfone)aniline was dissolved in alkali solution, and added into the solution obtained from (a) rapidly. The pH of the reaction solution was adjusted to 3~5 with 15% sodium carbonate, and the temperature of the reaction solution was controlled at 30~35° C. After overnight reaction, a solution was obtained.

(c) 30 parts of water was added into a solution with 2 parts of the compound of formula (2) and 3 parts of 32% HCl, followed by completely stirring and dispersion of the reaction solution. Then, 0.7 parts of sodium nitrite was added dropwise therein, and diazotization was performed under 5~10° C. and completed after 1 hour.

(d) The solution obtained form (b) was added into the solution obtained from (c), and the pH of the reaction solution was adjusted to 5~7 with 15% sodium carbonate. After the coupling reaction was performed for 4 hours, a orange product of the formula (10) was obtained by salt out.

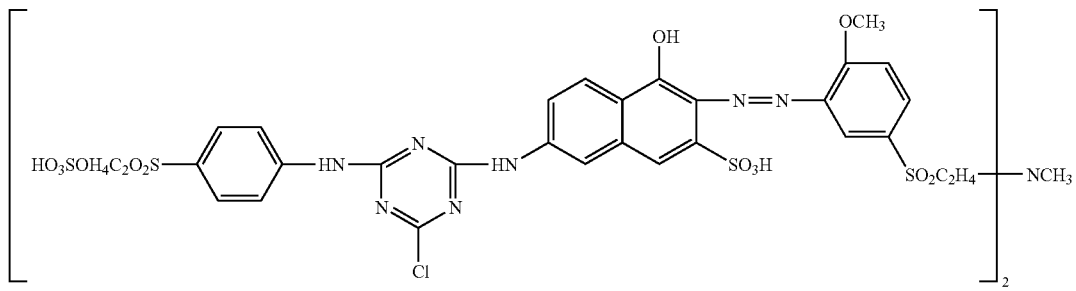

(10)

Example 11-14
According to the synthetic methods of Examples 5-10, the compounds (11)-(44) with N,N-dialkylamino bridge group were obtained, as shown in Table 1.
TABLE 1
| Example | Structure | Color Appearance |
|---|---|---|
| 11 | 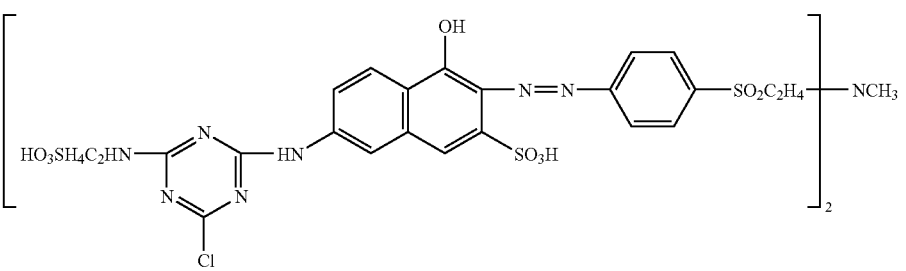 (11) | Orange |
| 12 | 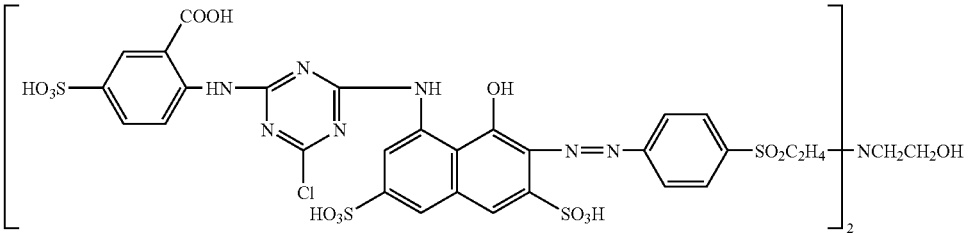 (12) | Red |
| 13 | 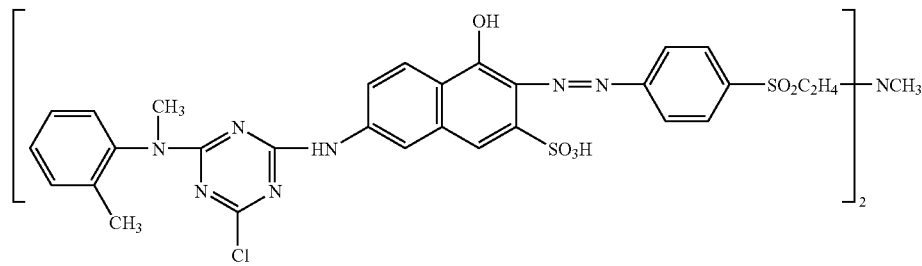 (13) | Orange |
| 14 | 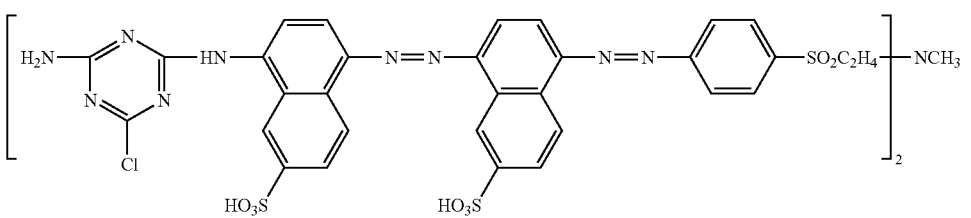 (14) | Brown |
| 15 | 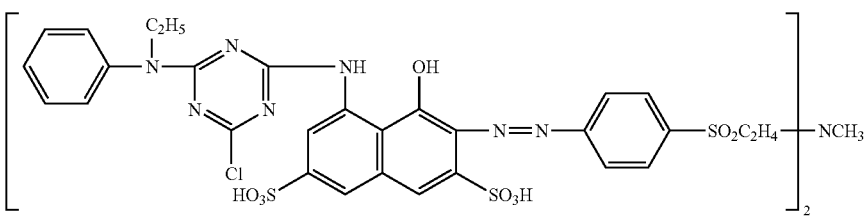 (15) | Red |

TABLE 1-continued
| Example | Structure | Color Appearance |
|---|---|---|
| 16 | 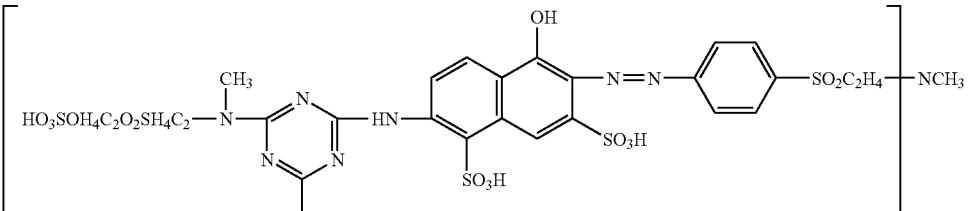 (16) | Scarlet |
| 17 | 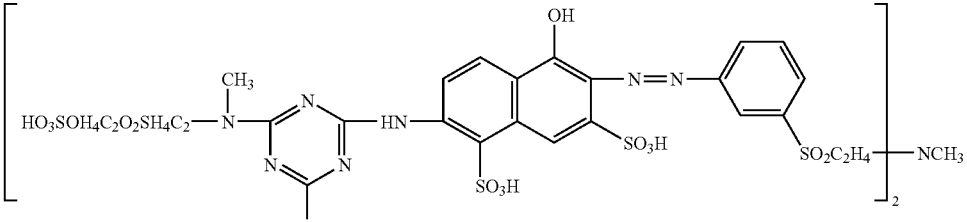 (17) | Scarlet |
| 18 | 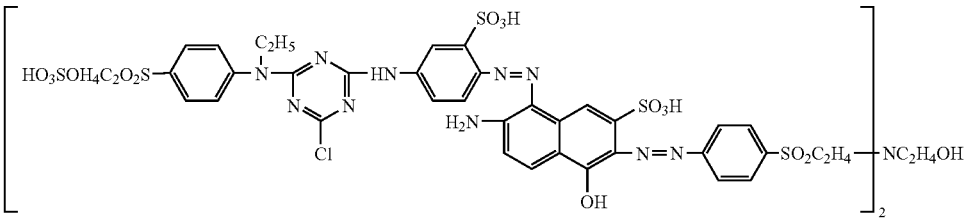 (18) | Red |
| 19 | 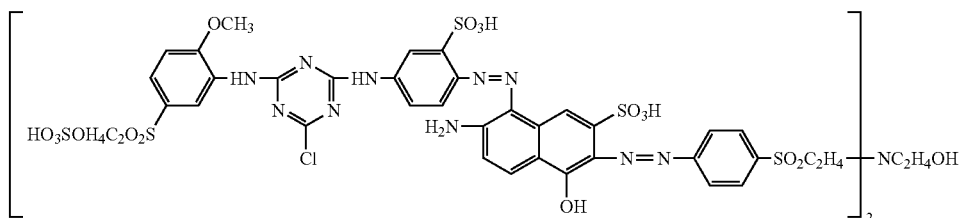 (19) | Red |
| 20 | 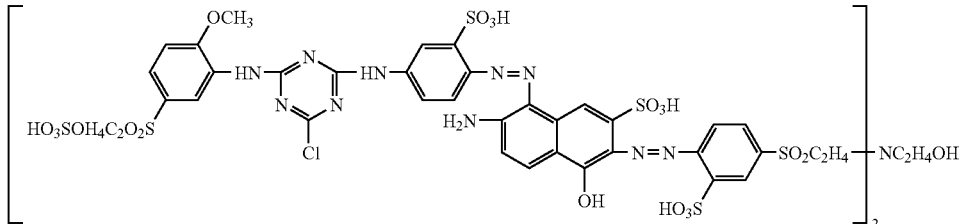 (20) | Red |

TABLE 1-continued

| Example | Structure | Color Appearance |
|---|---|---|
| 21 | (21) | Red |
| 22 | (22) | Red |
| 23 | (23) | Scarlet |
| 24 | (24) | Red |
| 25 | (25) | Brown |
| 26 | (26) | Brown |

TABLE 1-continued

| Example | Structure | Color Appearance |
|---|---|---|
| 27 | (27) | Brown |
| 28 | (28) | Brown |
| 29 | (29) | Brown |
| 30 | (30) | Brown |
| 31 | (31) | Blue |
| 32 | (32) | Blue |
| 33 | (33) | Blue |

TABLE 1-continued

| Example | Structure | Color Appearance |
|---|---|---|
| 34 | (34) | Blue |
| 35 | (35) | Blue |
| 36 | (36) | Blue |
| 37 | (37) | Red |
| 38 | (38) | Red |
| 39 | (39) | Yellow |

TABLE 1-continued
| Example | Structure | Color Appearance |
|---|---|---|
| 40 | 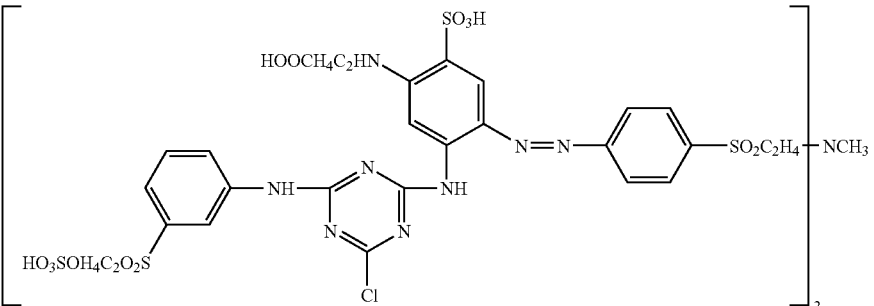 (40) | Yellow |
| 41 | 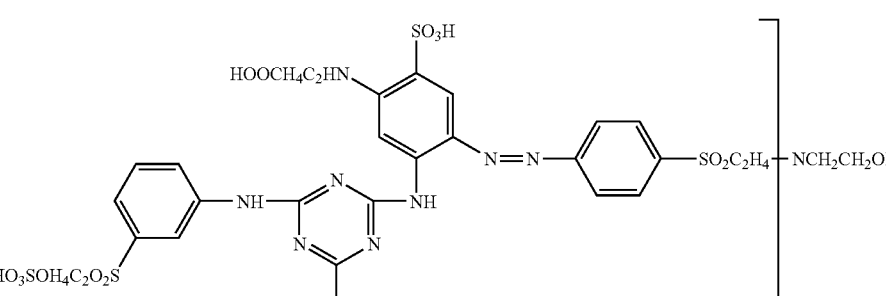 (41) | Yellow |
| 42 | 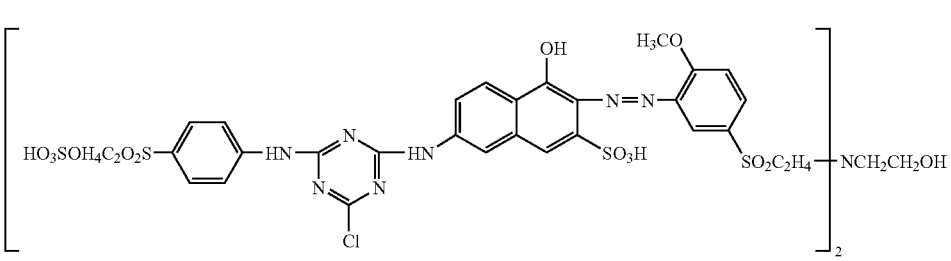 (42) | Orange |
| 43 | 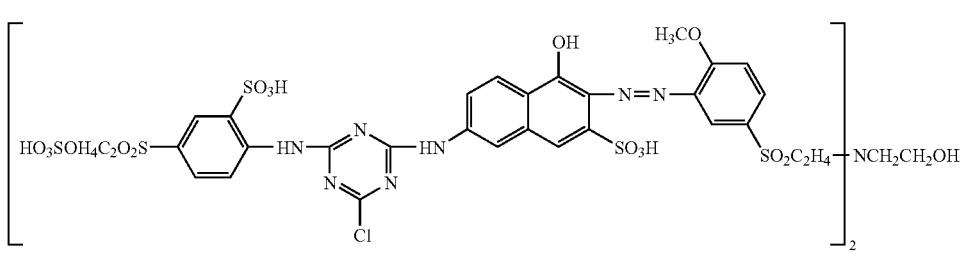 (43) | Orange |

TABLE 1-continued

| Example | Structure | Color Appearance |
|---|---|---|
| 44 | 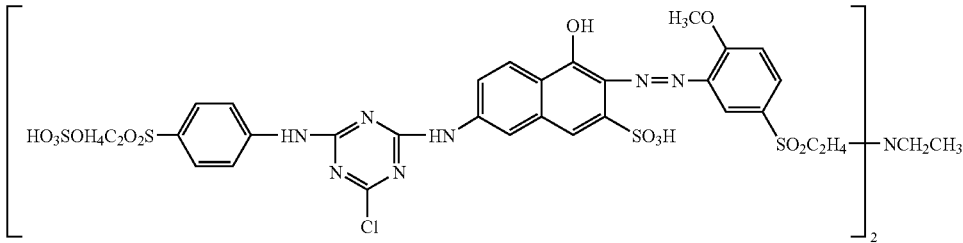<br>(44) | Orange |

Example 45

(a) 3.19 parts of 1-Naphthol-8-amino-3,6-disulfonic acid was dissolved in alkali solution, and added dropwise into 1.86 parts of cooled dispersion solution of cyanuric chloride. The pH of the reaction solution was adjusted with sodium hydrogen carbonate, and the temperature of the reaction solution was controlled at 8~10° C. After reaction for 2 hours, a resulted solution was filtered to obtain a filtrate.

(b) 2.8 parts of 4-(β-sulfatoethylsulfone)aniline was dissolved in alkali solution, and added into the solution obtained from (a) rapidly. The pH of the reaction solution was adjusted to 3~5 with 15% sodium carbonate, and the temperature of the reaction solution was controlled at 30~35° C. After overnight reaction, a solution was obtained.

(c) 20 parts of water was added into a solution with 2.14 parts of the compound of formula (4) and 2.5 parts of 32% HCl, followed by completely stirring and dispersion of the reaction solution. Then, 0.76 parts of sodium nitrite was added therein rapidly, and diazotization was performed under 5~10° C. After reacting for 1.5 hours, the solution obtained from (b) was added into the reaction solution, and the pH of the reaction solution was adjusted to 5~7 with sodium hydrogen carbonate. Then, the reaction was performed for 3 hours, and a red dye of the formula (45) was obtained.

Example 46

(a) 3.19 parts of 1-Naphthol-8-amino-3,6-disulfonic acid was dissolved in alkali solution, and added dropwise into 1.86 parts of cooled dispersion solution of cyanuric chloride. The pH of the reaction solution was adjusted to 1~3 with sodium hydrogen carbonate, and the temperature of the reaction solution was controlled at 8~10° C. After reaction for 2 hours, a resulted solution was filtered to obtain a filtrate.

(b) 2.8 parts of 4-(β-sulfatoethylsulfone)aniline was dissolved in alkali solution, and added into the solution obtained from (a). The pH of the reaction solution was adjusted to 3~5 with 15% sodium carbonate, and the temperature of the reaction solution was controlled at 30~35° C. After overnight reaction, a solution was obtained.

(c) 2.39 parts of 2-amino-5-naphthol-7-sulfonic acid was dissolved in alkali solution, and added dropwise into 1.9 parts of cooled dispersion solution of cyanuric chloride. The pH of the reaction solution was adjusted to 1~3 with 15% sodium carbonate, and the temperature of the reaction solution was controlled at 5~10° C. After reaction for 1.5 hours, a resulted solution was filtered to obtain a filtrate.

(d) 2.8 parts of 4-(β-sulfatoethylsulfone)aniline was dissolved in alkali solution, and added into the solution obtained from (a). The pH of the reaction solution was

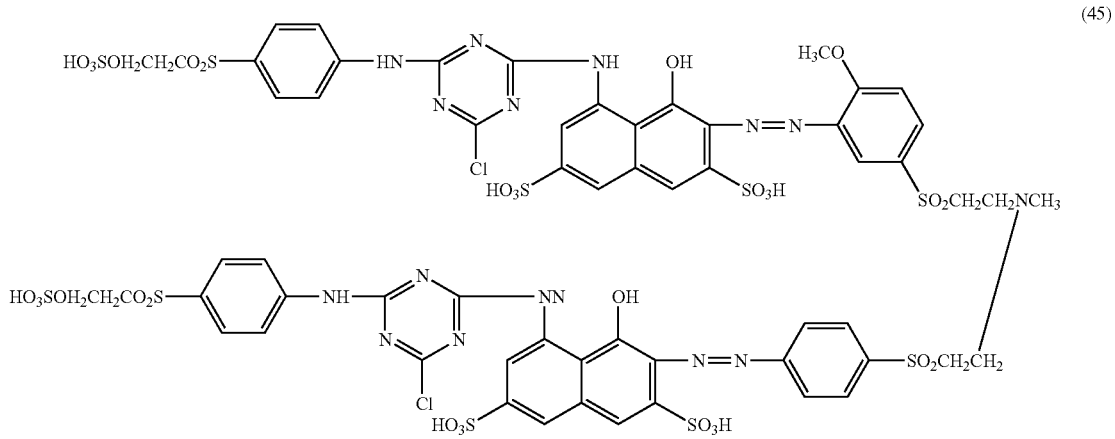

(45)

adjusted to 3~5 with 15% sodium carbonate, and the temperature of the reaction solution was controlled at 30~35° C. After overnight reaction, a solution was obtained.

(e) 20 parts of water was added into a solution with 2.14 parts of compound of formula (4) and 2.5 parts of 32% HCl, followed by completely stirring and dispersion of the reaction solution. Then, 0.76 parts of sodium nitrite was added therein rapidly, and diazotization was performed under 0~5° C. and completed after 1.5 hours. The resulted solution was added into the solution obtained from (b) and (d), and then the pH of the resulted solution was adjusted to 5~7 with sodium hydrogen carbonate. After the reaction was performed for 3 hours, a navy blue product of the formula (46) was obtained.

sodium alginate, and 815 parts of lukewarm water (1000 parts in total) are stirred in a vessel to obtain a completely homogeneous printing paste.

3 parts of the bis-reactive dye prepared in Example 7 are sprayed in 100 parts of the above printing paste and stirred to make a homogeneous colored paste. An adequate size piece of twilled cotton fabric is covered with a 100 mesh 45°-twilled printing screen and then painted with the colored paste on the printing screen to give a colored fabric.

This colored fabric is placed in an oven at 65° C. for 5 minutes until dry and then put into a steaming oven using saturated steam of 102~105° C. for 10 minutes.

The obtained red fabric is orderly washed with cold water, boiling water for 10 minutes, boiling non-ionic detergent for

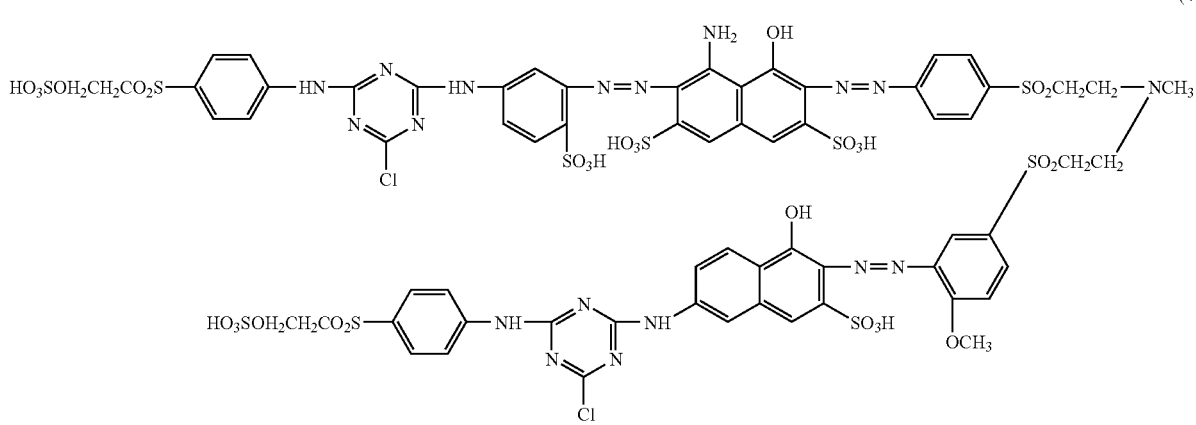

(46)

Testing Example 1

3 parts of the bis-reactive dye prepared in Example 5 are dissolved in 100 mL of water to obtain a 30 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained blue fabric is orderly washed with cold water, boiling water for 10 minutes, boiling non-ionic detergent for 10 minutes, again with cold water and then dried to obtain a navy blue fabric with good build up and good tinctorial yield.

Testing Example 2

3 parts of the bis-reactive dye prepared in Example 10 are dissolved in 100 mL of water to obtain a 30 parts/l padding liquor. 25 ml of alkali solvent (taking 15 ml/l of NaOH and 30 parts/l of Glauber's salt) is added to the padding liquor and stirred thoroughly. The resultant solution is then put into a pad roller machine. The cotton fabric is padded by the roller pad machine, and batched for 4 hours under room temperature. The obtained yellow fabric is orderly washed with cold water, boiling water for 10 minutes, boiling non-ionic detergent for 10 minutes, again with cold water and then dried to obtain a orange fabric with good build up and good tinctorial yield.

Testing Example 3

100 parts of Urea, 10 parts of m-nitrobenzene sulfonic acid sodium salt, 20 parts of sodium bicarbonate, 55 parts of 10 minutes, again with cold water and then dried to obtain a red fabric with good build up and good tinctorial yield.

From the foregoing description, the technology according to the present invention achieves the objects of the invention and conforms to the patent requirements of novelty, inventive step and industrial applicability. Although the present invention has been explained in relation to its preferred examples, it is to be understood that many other possible modifications and variations can be made without departing from the scope of the invention as hereinafter claimed.

What is claimed is:

1. A bis-reactive dye with N,N-dialkylamino bridge group of the following formula (I):

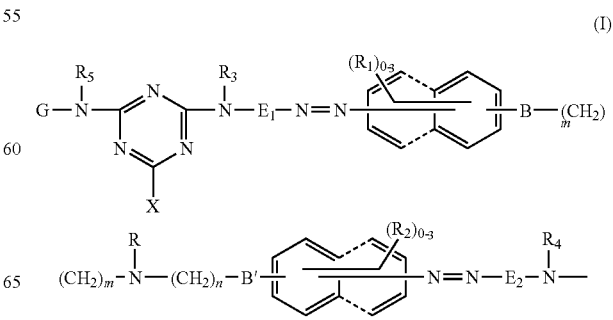

(I)

-continued

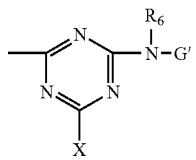

wherein
$E_1$, and $E_2$ each independently are selected from the group consisting of substituted or unsubstituted benzene component, substituted or unsubstituted naphthalene component, and substituted or unsubstituted monoazo component;
R is hydrogen, $C_{1-4}$ alkyl, $C_{1-4}$ alkylcarbonyl, phenyl, nitroso, or $C_{1-4}$ alkyl substituted with halogen, hydroxyl, carboxyl or sulfo;
$(R_1)_{0-3}$, and $(R_2)_{0-3}$ each independently are 0 to 3 identical or different groups, and each of $R_1$, and $R_2$ is independently selected from the group consisting of hydrogen, halogen, hydroxyl, carboxyl, sulfo, nitro, cyano, $C_{1-4}$ alkyl, $C_{1-4}$ alkoxy, ureido, and amido;
$R_3$, and $R_4$ each independently are hydrogen or $C_{1-4}$ alkyl;
$R_5$, and $R_6$ each independently are hydrogen, $C_{1-4}$ alkyl, or phenyl;
G, and G' each independently are selected from the group consisting of hydrogen,

Q, and substituted or unsubstituted $C_{1-4}$ alkyl;
$(R_7)_{0-3}$ is 0 to 3 identical or different groups, and each of $R_7$ is independently selected from the group consisting of hydrogen, halogen, hydroxyl, carboxyl, sulfo, nitro, cyano, $C_{1-4}$ alkyl, $C_{1-4}$ alkoxy, ureido, and amido;
B, and B' each independently are selected from the group consisting of a direct bond, —SO$_2$—, and —CONH—(CH$_2$)$_k$—SO$_2$—;
k is an integer of 1, 2, 3, 4, 5, or 6;
Q is selected from the group consisting of —SO$_2$—U, —CONH—(CH$_2$)$_d$—SO$_2$—U, —O—(CH$_2$)$_r$—CONH—(CH$_2$)$_d$—SO$_2$—U, β-thiosulfatoethylsulfonyl, —R'—SO$_2$—U, and —R'—U';
R' is $C_{1-4}$ alkyl or phenyl;
d, and r each independently are an integer of 2, 3, or 4;
U is —CH$_2$CH$_2$W, or —CH=CH$_2$;

W is —Cl, —OSO$_3$H, —OPO$_3$H, quaternary ammonium, pyridine, carboxypyridinium, methylpyridinium, carbonamidopyridinium, or

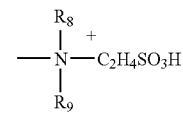

$R_8$, and $R_9$ each independently are hydrogen, or $C_{1-4}$ alkyl;
U' is α,β-halopropionyl, α-halopropionyl, β-halopropionyl, or α-haloacrylol;
X is halogen;
m, and n each independently are an integer of 2, 3, or 4; and the ring with the dashed lines represents an optional fused benzene ring.

2. The bis-reactive dye with N,N-dialkylamino bridge group as claimed in claim 1, wherein R is hydrogen, $C_{1-4}$ alkyl, $C_{1-4}$ alkylcarbonyl, phenyl, nitroso, or $C_{1-4}$ alkyl substituted with hydroxyl, or sulfo.

3. The bis-reactive dye with N,N-dialkylamino bridge group as claimed in claim 1, wherein $(R_1)_{0-3}$, and $(R_2)_{0-3}$ each independently are 0 to 3 identical or different groups, and each of $R_1$, and $R_2$ is independently selected from the group consisting of hydrogen, sulfo, $C_{1-4}$ alkyl, and $C_{1-4}$ alkoxy.

4. The bis-reactive dye with N,N-dialkylamino bridge group as claimed in claim 1, wherein G, and G' each independently are selected from the group consisting of hydroge,

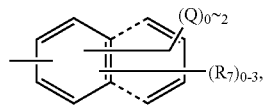

and Q; and the ring with the dashed lines represents an optional fused benzene ring.

5. The bis-reactive dye with N,N-dialkylamino bridge group as claimed in claim 1, wherein $(R_7)_{0-3}$ is 0 to 3 identical or different groups, and each of $R_7$ is independently selected from the group consisting of hydrogen, sulfo, $C_{1-4}$ alkyl, and $C_{1-4}$ alkoxy.

6. The bis-reactive dye with N,N-dialkylamino bridge group as claimed in claim 1, wherein B, and B' each independently are selected from the group consisting of —SO$_2$—, and —CONH—(CH$_2$)$_k$—SO$_2$—.

7. The bis-reactive dye with N,N-dialkylamino bridge group as claimed in claim 1, wherein Q is selected from the group consisting of —SO$_2$—U, —CONH—(CH$_2$)$_d$—SO$_2$—U, —R'—SO$_2$—U, and —R'—U'.

8. The bis-reactive dye with N,N-dialkylamino bridge group as claimed in claim 1, wherein $E_1$, and $E_2$ each independently are substituted or unsubstituted benzene component of the following formula:

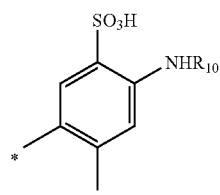

wherein * represents a position for coupling, $R_{10}$ is hydrogen, $C_{1-4}$ alkyl, $C_{2-4}$ alkylcarboxyl, or $C_{1-4}$ alkyl substituted with hydroxyl, cyano, carboxyl, sulfo, methoxycarbonyl, ethoxycarbonyl, or acetoxy.

9. The bis-reactive dye with N,N-dialkylamino bridge group as claimed in claim 1, wherein $E_1$, and $E_2$ each independently are substituted or unsubstituted naphthalene component of the following formula:

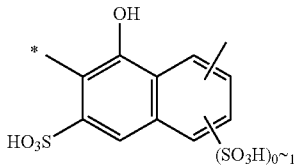

wherein * represents a position for coupling.

10. The bis-reactive dye with N,N-dialkylamino bridge group as claimed in claim 1, wherein $E_1$, and $E_2$ each independently are substituted or unsubstituted monoazo component of the following formula:

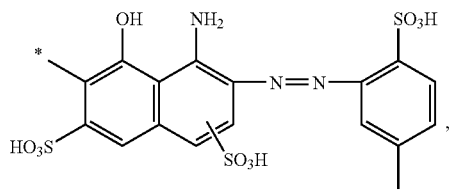

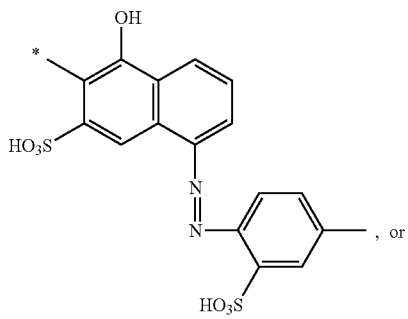

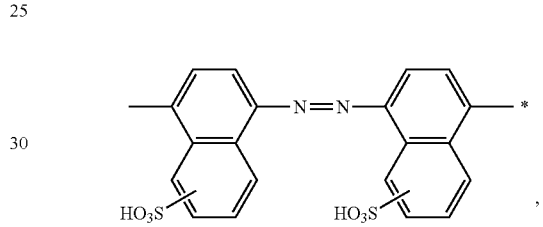

wherein * represents a position for coupling.

11. The bis-reactive dye with N,N-dialkylamino bridge group as claimed in claim 1, wherein X is Cl.

12. The bis-reactive dye with N,N-dialkylamino bridge group as claimed in claim 1, wherein the bis-reactive dye of the formula (I) is a compound of the following formula (II),

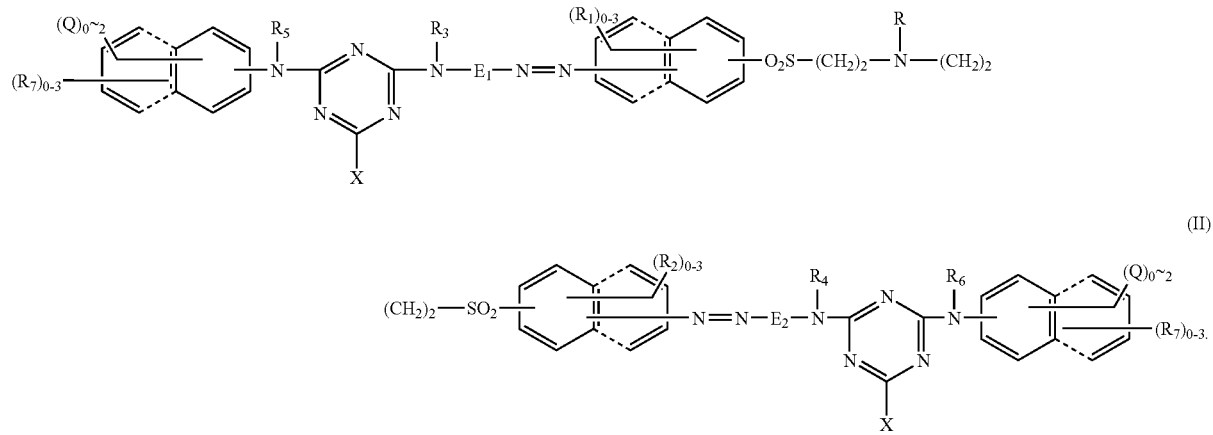

(II)

and the ring with the dashed lines represents an optional fused benzene ring.

13. The bis-reactive dye with N,N-dialkylamino bridge group as claimed in claim 12, wherein the bis-reactive dye of the formula (II) is a compound of the following formula (5),

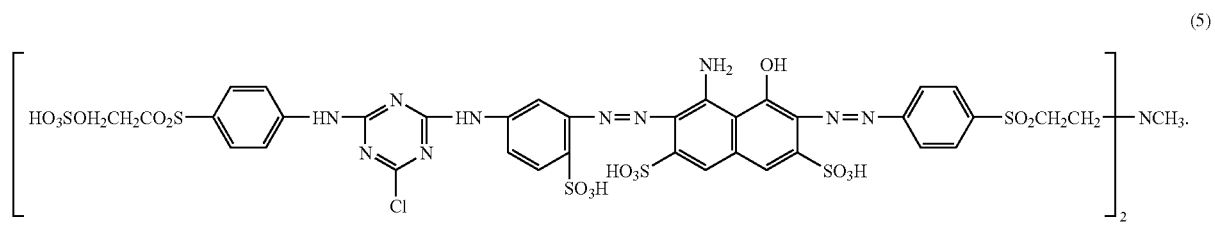
(5)

14. The bis-reactive dye with N,N-dialkylamino bridge group as claimed in claim 12, wherein the bis-reactive dye of the formula (II) is a compound of the following formula (6),

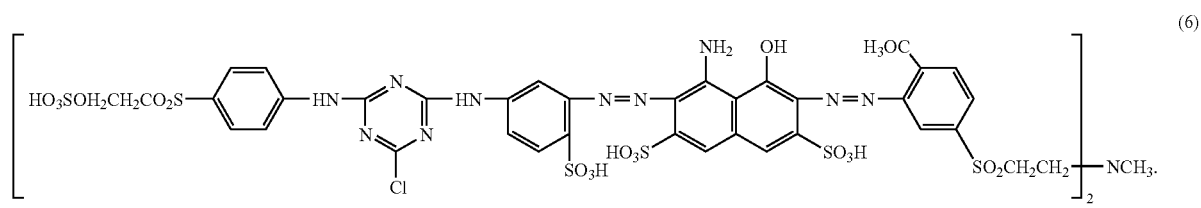
(6)

15. The bis-reactive dye with N,N-dialkylamino bridge group as claimed in claim 12, wherein the bis-reactive dye of the formula (II) is a compound of the following formula (7),

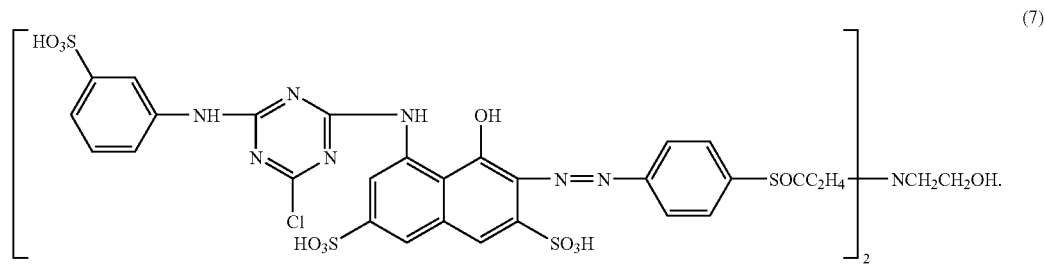
(7)

16. The bis-reactive dye with N,N-dialkylamino bridge group as claimed in claim 12, wherein the bis-reactive dye of the formula (II) is a compound of the following formula (8),

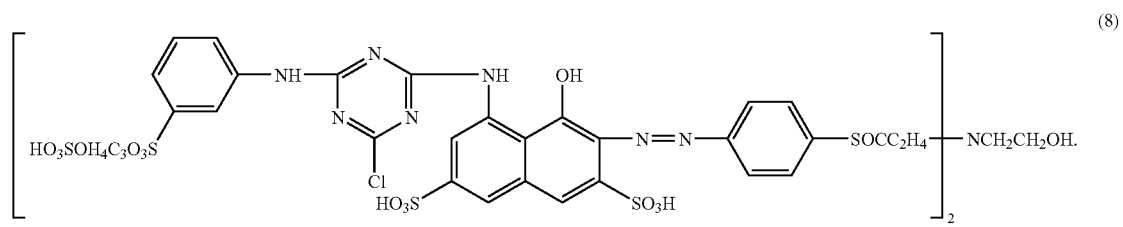
(8)

17. The bis-reactive dye with N,N-dialkylamino bridge group as claimed in claim 12, wherein the bis-reactive dye of the formula (II) is a compound of the following formula (9),
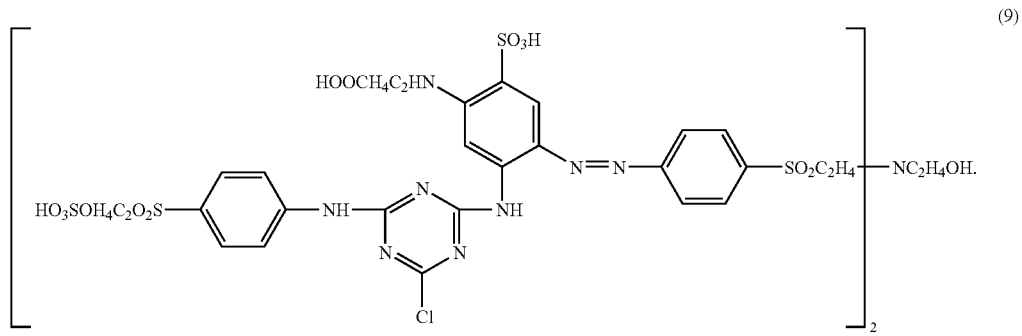
(9)
18. The bis-reactive dye with N,N-dialkylamino bridge group as claimed in claim 12, wherein the bis-reactive dye of the formula (II) is a compound of the following formula (10),
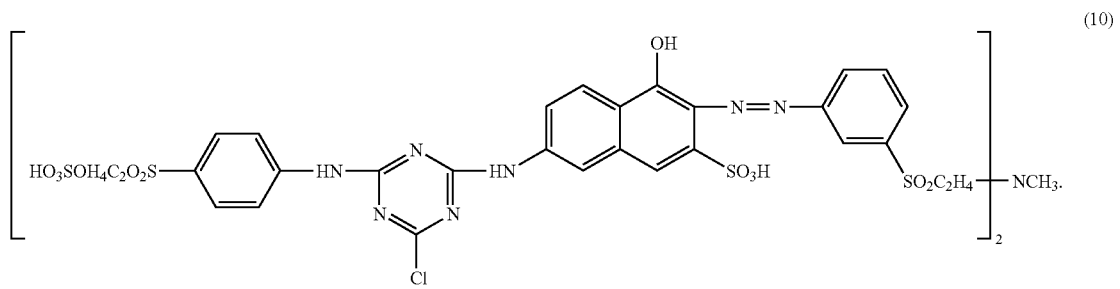
(10)
\* \* \* \* \*